United States Patent [19]

Lau et al.

[11] Patent Number: 5,500,293
[45] Date of Patent: Mar. 19, 1996

[54] ADHESIVE COMPOSITIONS WITH IMPROVED PLASTICIZER RESISTANCE

[75] Inventors: Felix P. Lau; Timothy D. Bredahl; George E. Cox, all of Austin, Tex.

[73] Assignee: Minnesota Mining and Manufacturing Company, St. Paul, Minn.

[21] Appl. No.: 14,196

[22] Filed: Feb. 5, 1993

[51] Int. Cl.$^6$ .............................. C08L 7/00; C08L 53/00
[52] U.S. Cl. .................... 428/355; 428/343; 524/270; 524/271; 524/272; 524/274; 525/95; 525/98; 525/99; 525/314
[58] Field of Search ................... 525/95, 98, 99, 525/314; 524/270, 271, 272, 274; 428/343, 355

[56] References Cited

U.S. PATENT DOCUMENTS

| | | | |
|---|---|---|---|
| 3,660,323 | 5/1972 | Raguse | 525/95 |
| 3,932,328 | 1/1976 | Korpman | 260/27 |
| 4,045,600 | 8/1977 | Williams | 427/379 |
| 4,060,503 | 11/1977 | Feeney et al. | 525/95 |
| 4,102,835 | 7/1978 | Freeman et al. | 260/5 |
| 4,136,071 | 1/1979 | Korpman | 260/27 |
| 4,181,635 | 1/1980 | Takamatsu et al. | 525/95 |
| 4,272,573 | 6/1981 | Ewald et al. | 428/40 |
| 4,717,749 | 1/1988 | Tang et al. | 524/271 |
| 4,732,936 | 3/1988 | Holohan, Jr. | 525/98 X |
| 4,946,742 | 8/1990 | Landin | 428/354 |
| 5,028,646 | 7/1991 | Miller et al. | 525/98 X |

FOREIGN PATENT DOCUMENTS 59-28236  7/1984  Japan.

*Primary Examiner*—George F. Lesmes
*Assistant Examiner*—Blaine R. Copenheaver
*Attorney, Agent, or Firm*—Gary L. Griswold; Walter N. Kirn; Darla P. Neaveill

[57] ABSTRACT

The invention provides an adhesive composition suitable for use in an insulating tape having improved plasticizer resistance, comprising from about 13% to about 42% of a polyisoprene homopolymer, from about 13% to about 42% of a styrene-isoprene-styrene copolymer, from about 25% to about 55% of an aliphatic tackifying agent containing from about 4 to about 6 carbon atoms, and from about 2% to about 20% of an end block reinforcing resin.

8 Claims, 3 Drawing Sheets

ADHESIVE COMPOSITIONS WITH IMPROVED PLASTICIZER RESISTANCE

BACKGROUND OF THE INVENTION

1. Field of the Invention

The invention relates to adhesive compositions and adhesive tapes suitable for use as insulating tapes.

2. Description of the Art

Various types of adhesives are known in the art for use as insulating tapes.

U.S. Pat. No. 4,732,936 discloses copolymers of alpha methylstyrene and paramethyl styrene. The copolymers are disclosed to be especially useful as reinforcing or modifying resins for block copolymers having aromatic and aliphatic blocks contained in pressure-sensitive adhesives. Examples of block copolymers include styrene-isoprene-styrene, styrene-butadiene-styrene and styrene-ethyl-butylene-styrene.

U.S. Pat. No. 4,717,749 discloses a pressure-sensitive adhesive composition comprising an ABA block polymer wherein A represents a copolymer of styrene and alpha-methylstyrene and B represents blocks of diene polymer. The diene polymer can be butadiene, isoprene or a mixture thereof. A tackifying resin is also present in the composition.

U.S. Pat. No. 4,102,835 discloses a pressure-sensitive adhesive having improved physical strength provided by adding 5 to 30 parts of an ABA block copolymer to the normally tacky rubber polymers. Isoprene, polybutadiene and the like are disclosed as base polymers; preferred block copolymers include styrene-butadiene copolymers, styrene isoprene polymers and the like.

U.S. Pat. No. 4,181,635 discloses a pressure-sensitive adhesive composition having excellent tack and improved thermal resistance comprising a low molecular weight isoprene and an elastomer. Useful elastomers include polybutadiene, polyisoprene, styrene-butadiene rubbers, styrene-isoprene copolymers, and the like.

U.S. Pat. No. 4,060,503 discloses an adhesive composition comprising an admixture of at least one natural rubber and synthetic rubber with a tackifying resin containing 2-12% of an alpha-methylstyrene modified piperylene/2-methyl-2-butene resin, which is disclosed to enhance the tack.

Japanese Patent Kokoku 59-28236 (translated) discloses isoprene pressure-sensitive adhesives having a blend containing 20–65% cis-1,4-polyisoprene rubber and correspondingly, 80%–35% styrene-isoprene block copolymer, and from 10% up to 250% tackifier. The composition is disclosed to have a better balance of cohesion and adhesion properties; however, if the lower limit of the tackifier is indeed 10%, such compositions would not be pressure-sensitive adhesives.

U.S. Pat. No. 4,136,071 discloses a pressure-sensitive adhesive comprising 50–90 parts of a linear or radial styrene-isoprene-styrene copolymer, 10–50 parts of a simple styrene-isoprene copolymer. It is further disclosed that the adhesive may include small amounts of other elastomers, but these should not exceed 25%.

U.S. Pat. No. 3,660,323 discloses a pressure-sensitive adhesive which includes a blend of a polyisoprene, a polystyrene-polyisoprene-polystyrene block copolymer and natural rubber. The natural rubber is a critical ingredient said to improve the adhesion of the mass to the backing without detracting from tack, holding power and absence of allergenic characteristics.

U.S. Pat. No. 3,932,328 discloses a pressure-sensitive adhesive which comprises a C5 solid tackifier, a liquid tackifier, and 100 parts of a styrene-isoprene-styrene elastomer. However, these adhesives show low adhesion to plasticized vinyl backings, and have a raspy unwind which is considered undesirable for an insulating tape.

It is also known that flexible vinyl substrates containing plasticizers cause problems for adhesives as they leach from such substrates, contaminating the adhesives. This is especially true for low molecular weight monomeric plasticizers, which are widely used because they are inexpensive. Adhesives typically show a significant decrease in adhesion over time as the plasticizer leaches into the adhesive and softens it.

Various solutions have been suggested for this problem, including interposing an impenetrable barrier layer, as disclosed in U.S. Pat. No. 4,045,600. It has also been suggested that incorporating plasticizer directly into the adhesive will reduce the gradient of plasticizer between contacting layers, and prevent migration. See, e.g., U.S. Pat. Nos. 4,272,573 and 4,946,742.

The present inventors have now discovered that "smooth unwind" adhesives useful as adhesive compositions, especially and as adhesives for insulating tapes, may be made by combining polyisoprene homopolymers, certain elastomeric block copolymers, solid tackifiers, and a reinforcing end block resin.

It has further been discovered that such adhesives when placed on a substrate, form a tape which shows improved resistance to softening caused by plasticizers over conventional insulating tapes, while continuing to exhibit good adhesive properties.

SUMMARY OF THE INVENTION

The invention provides adhesives suitable for use in insulating tapes, comprising
 a) from about 13% to about 42% of a polyisoprene homopolymer,
 b) from about 13% to about 42% of a styrene-isoprene-styrene copolymer,
 c) from about 25% to about 55% of an aliphatic tackifying agent containing from about 4 to about 6 carbon atoms,
 d) from about 2% to about 20% of an end block reinforcing resin, wherein said adhesive exhibits improved plasticizer resistance.

Adhesives of the invention are suitable for use with a vinyl backing or substrate. They may also be suitable for use with nonvinyl backings.

Preferred adhesives of the invention comprise:
 a) from about 20% to about 35% of a polyisoprene homopolymer,
 b) from about 20% to about 35% of a styrene-isoprene-styrene copolymer,
 c) from about 25% to about 55% of an aliphatic tackifying agent containing from about 4 to about 6 carbon atoms,
 d) from about 2% to about 20% of an end block reinforcing resin, and
 e) from about 0.1 to about 2% of an antioxidant,
wherein said adhesive exhibits improved plasticizer resistance.

As used herein, these terms have the following meanings.

1. "Vinyl" and "vinyl backing" refer to film forming polymers which contain polyvinyl chloride, used as substrates for adhesive compositions.
2. "Plasticizer Resistance" means that an adhesive has increased resistance to softening caused by migration of plasticizer into the adhesive from the substrate on which the adhesive is coated.

Unless specifically noted otherwise, all percents, parts and ratios herein are by weight.

DETAILED DESCRIPTION OF THE INVENTION

Figure 1:
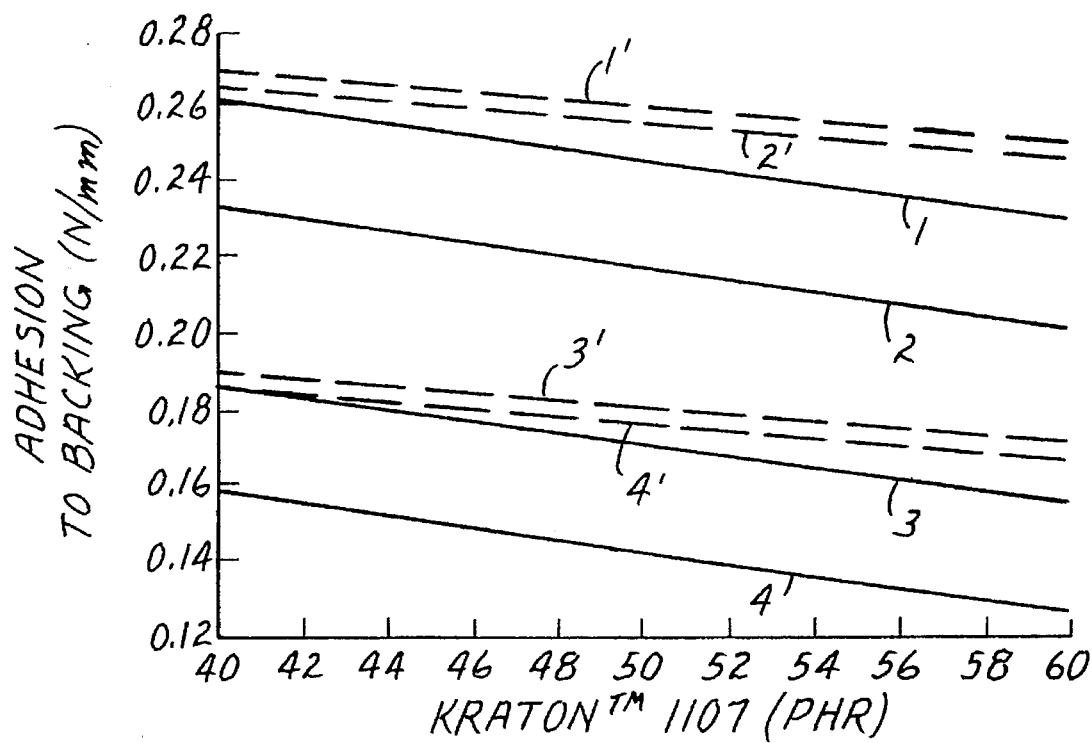
FIG. 1 shows the graph of adhesion to backing plotted as a function of the amount of Kraton™ 1107, a styrene-isoprene-styrene copolymer.

Polyisoprene homopolymers useful in adhesive compositions of the invention include those comprised of cis-1,4 structure produced by polymerization with a Ziegler or lithium type catalyst. Some trans-1,4 polyisoprene may also be present in the homopolymer, however high cis-1,4 homopolyisoprene homopolymers are preferred.

Adhesive compositions of the invention contain from about 13% to about 42% polyisoprene homopolymer, preferably from about 20% to about 35%. Commercially available examples include those available from Shell Chemical Company under the trade name Cariflex™, and those available from Goodyear Tire and Rubber Co. under the trade name Natsyn™.

The adhesive compositions of the invention further contain from about 13% to about 42% of a styrene-isoprene-styrene A-B-A block copolymer, preferably from about 20% to about 35%. Typical configurations include linear triblock, radial, branched and tapered geometries. The A block is rigid at the service temperature while the B block is usually elastomeric at the service temperatures. Useful copolymers include those in which the A block is polystyrene, alphamethyl styrene, t-butyl styrene, and other ring alkylated styrenes as well as mixtures of some of all of the above B is an elastomeric conjugated diene, i.e., isoprene, having an average molecular weight of from about 5,000 to about 500,000. Other conventional diene elastomers may be added in minor amounts, but not to the extent that the adhesive properties are affected. Commercially available examples include those available from Shell Chemical Company under the trade name Kraton™, those available from Exxon Chemical Company under the trade name Vector™, and those available from EniChem Elastomers Americas, Inc, under the trade name Europrene™.

The adhesive compositions of the invention also contain from about 2% to about 20% of an end block reinforcing resin, preferably from about 5% to about 15% thereof. The reinforcing end block resin is an aromatic, essentially hydrocarbon resin, which typically has a glass transition temperature higher than the use temperature of the adhesive and typically higher than that of the end block of the block copolymer and the solid tackifier resin in the adhesive. Generally, the aromatic resin is compatible with and associated with the vinyl arene end blocks of the block copolymer. Typical reinforcing resins suitable for use in the insulating tape of the invention include low molecular weight polymers of styrene and alpha-methylstyrene and para-methylstyrene, as well as copolymers of these. Commercially available examples include Endex™ 155 and Endex™ 160, Kristalex™ 5140, and Kristalex™ 1120, all available from Hercules Inc.

The solid tackifying agents useful in adhesives and tapes of the invention include rosin esters, hydrogenated rosin esters, polyterpene resins, polymerized hydrocarbon resins containing from about 4 to about 6 carbon atoms, resins from polymerized C9 hydrocarbon streams, and the like. These agents may also be further hydrogenated. Commercially available resins include Wingtack™ Plus from Goodyear Chemical Company, Escorez™ 1310 from Exxon Chemical Company, and Piccolyte™ A135 from Hercules, Inc. The tackifying resins are present in amounts of from about 25% to about 55%, preferably from about 30% to about 45%.

The adhesive compositions of the invention preferably include an antioxidant. When present, the antioxidant is useful in amounts of from about 0.1% to about 2%, preferably 0.5% to about 1.5%. Useful antioxidants include 2,5 di(tert-amyl)hydroquinone, and tertiary butyl hydroxytoluene.

Other conventional additives and fillers may be used in the adhesives and tapes of the invention, including but not limited to, crosslinking agents, heat stabilizers, ultraviolet stabilizers, pigments and coloring agents and the like.

The adhesives of the invention may be produced by conventional methods including solution coating, hot-melt gravure coating, hot-melt extrusion coating, and the like. Hot-melt coating is preferred.

Adhesive tapes may be formed by coating the adhesive onto any useful substrate. Conventional tape backings include poly(vinyl chloride) films, acrylic films, polyesters, polyamides and the like, as well as such backings as foil, paper, and nonwovens. So formed, the tapes are useful for any application requiring an adhesive bond. Such backings may be provided with a low adhesion backsize, if desired, such as a urethane or a siloxane.

The adhesives of the invention are especially useful when combined with an appropriate backing to form an insulating tape.

DETAILED DESCRIPTION OF THE FIGURES

The compositions of the adhesives plotted in FIGS. 1–4 are shown in the table below, Table A.

TABLE A

Kraton 1107 Natsyn 2210 Wingtack Plus Endex 160
(parts per hundred rubber)

FIG. 1

TABLE A-continued

Kraton 1107 Natsyn 2210 Wingtack Plus Endex 160
(parts per hundred rubber)

Figure 2:
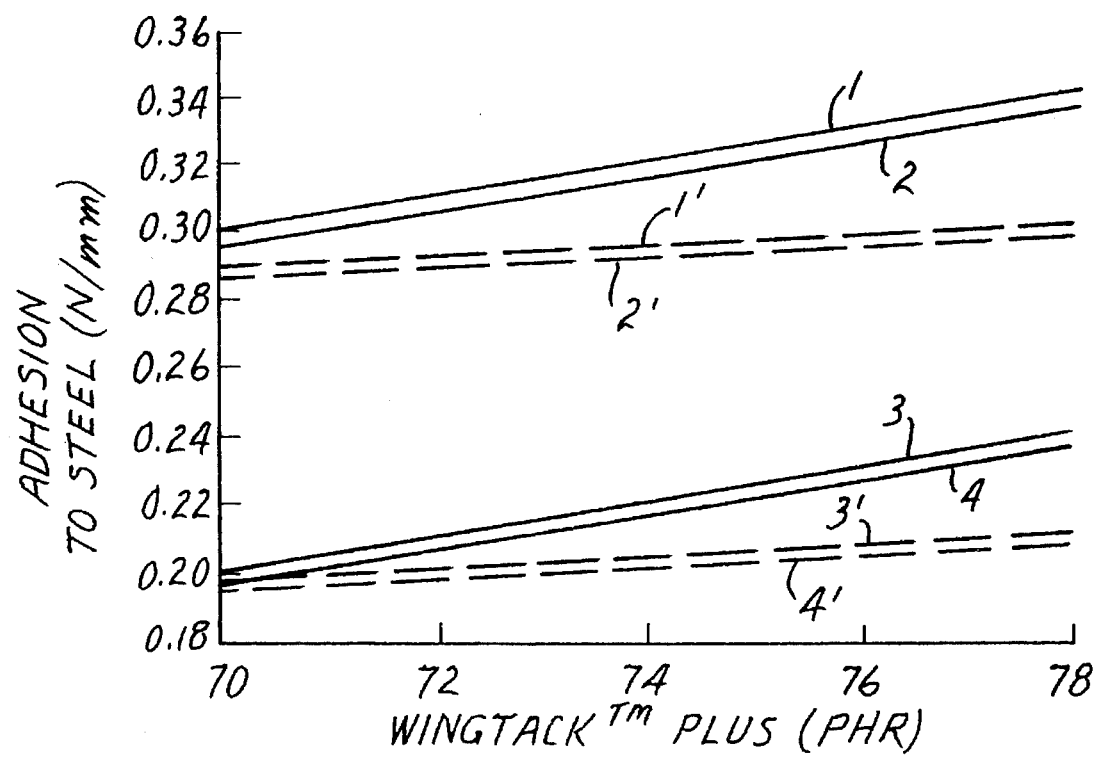
FIG. 2 shows the graph of adhesion to steel plotted as a function of the amount of Wingtack™ Plus, a tackifier.
Figure 3:
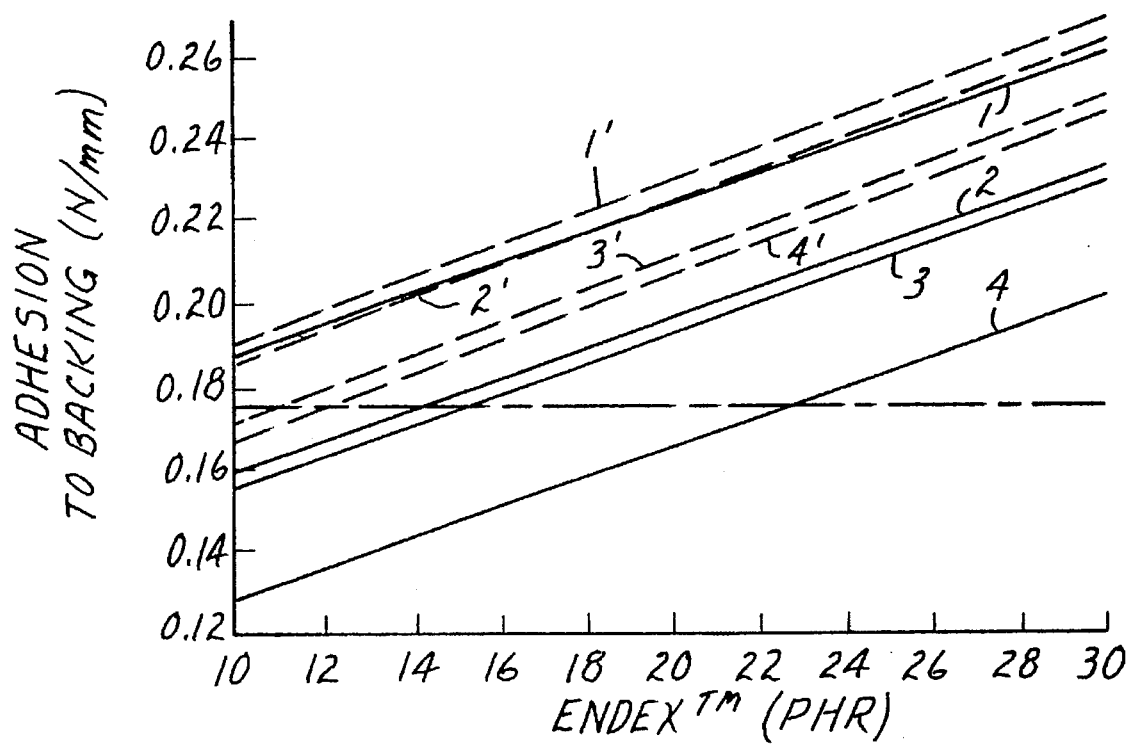
FIG. 3 shows the graph of adhesion to backing plotted as a function of the amount of Endex™ 160, a reinforcing end block resin.
Figure 4:
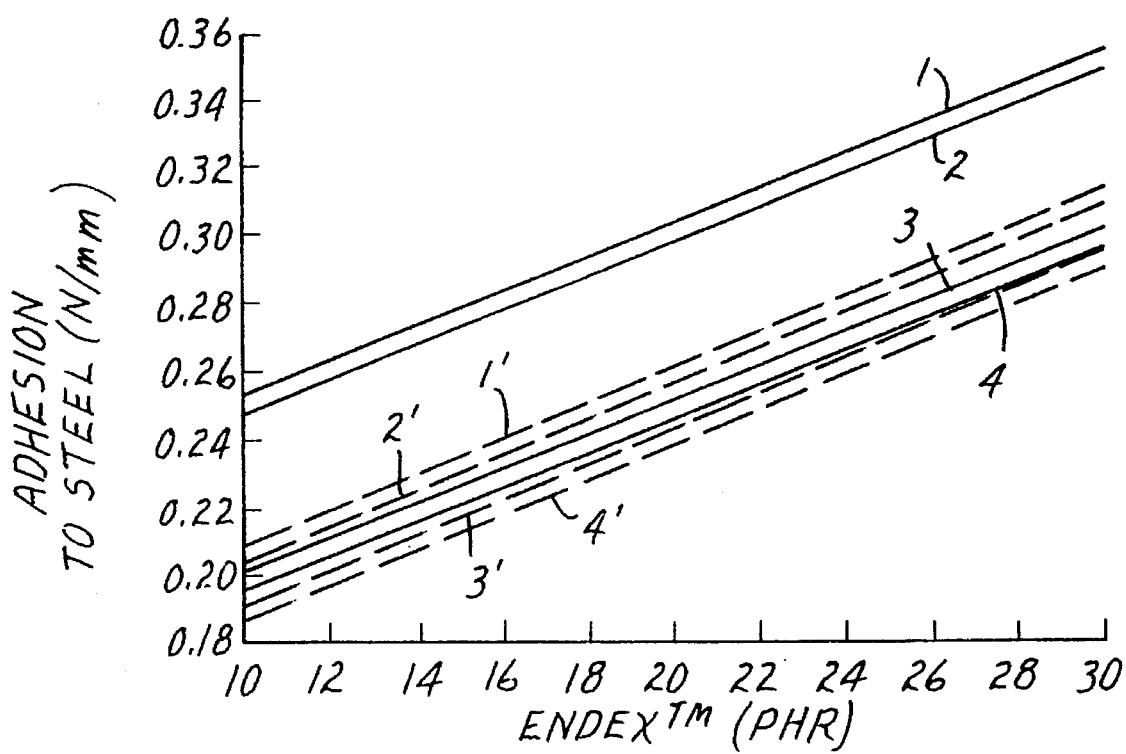
FIG. 4 shows the graph of adhesion to steel plotted as a function of the amount of Endex™ 160, a reinforcing end block resin.

| | Kraton 1107 | Natsyn 2210 | Wingtack Plus | Endex 160 |
|---|---|---|---|---|
| 1 & 1' | — | — | 80 | 30 |
| 2 & 2' | — | — | 70 | 30 |
| 3 & 3' | — | — | 80 | 10 |
| 4 & 4' | — | — | 70 | 10 |
| FIG. 2 | | | | |
| 1 & 1' | 60 | 40 | — | 30 |
| 2 & 2' | 40 | 60 | — | 30 |
| 3 & 3' | 60 | 40 | — | 10 |
| 4 & 4' | 40 | 60 | — | 10 |
| FIG. 3 | | | | |
| 1 & 1' | 40 | 60 | 80 | — |
| 2 & 2' | 40 | 60 | 70 | — |
| 3 & 3' | 60 | 40 | 80 | — |
| 4 & 4' | 60 | 40 | 70 | — |
| FIG. 4 | | | | |
| 1 & 1' | 60 | 40 | 80 | — |
| 2 & 2' | 40 | 60 | 80 | — |
| 3 & 3' | 60 | 40 | 70 | — |
| 4 & 4' | 40 | 60 | 70 | — |

FIG. 1 shows the effect of the amount of the block copolymer in the adhesive to the adhesion to backing of tapes of this invention before storage, shown by solid lines and after storage, shown by dotted lines, in a 65° C. oven for seven days. Adhesion to backing is reduced when higher levels of block copolymer is used in the adhesive. Surprisingly, the polyisoprene homopolymer improves the adhesion to backing (block copolymer+polyisoprene=100 parts per hundred rubber or phr). The end block resin also greatly improves the adhesion, while the tackifier has a small effect.

FIG. 2 shows that adhesion to steel increases with the amount of tackifier in the adhesive before and after the storage in a 65° C. oven for one week. The end block reinforcing resin also greatly increases the adhesion.

FIGS. 3 and 4 show that the end block resin improves adhesion to steel and adhesion to backing before and after the 65° C. and 7 day storage. The tackifier has more effect on the adhesion to steel before the storage than after the storage.

Figure 5:
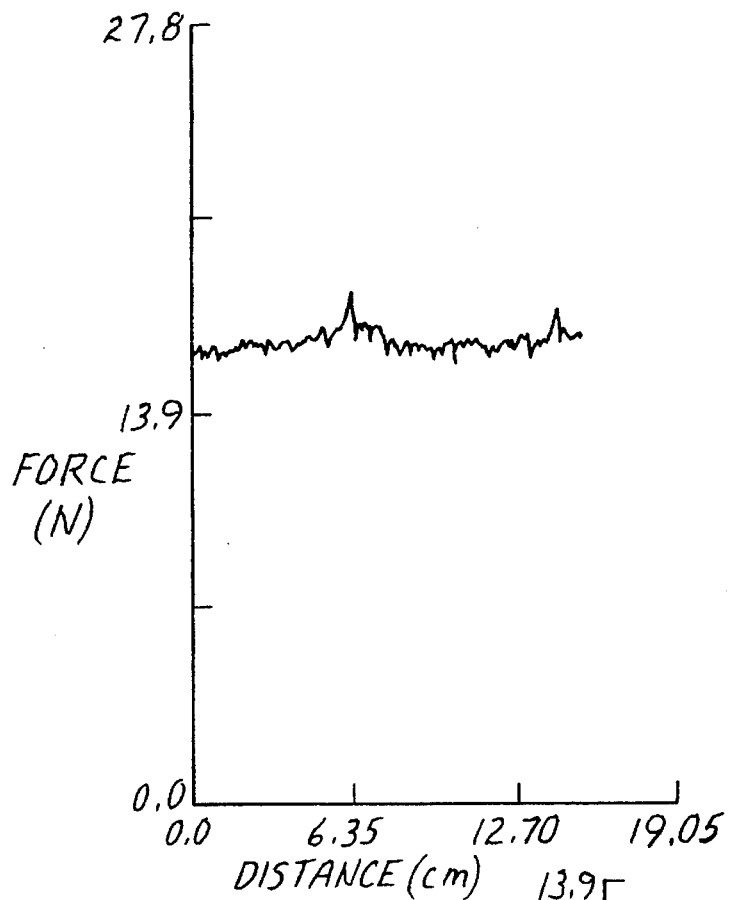
FIG. 5 shows the results, for an adhesive of the invention, of a roll unwind test wherein the distance unwound is plotted as a function of the force needed.
Figure 6:
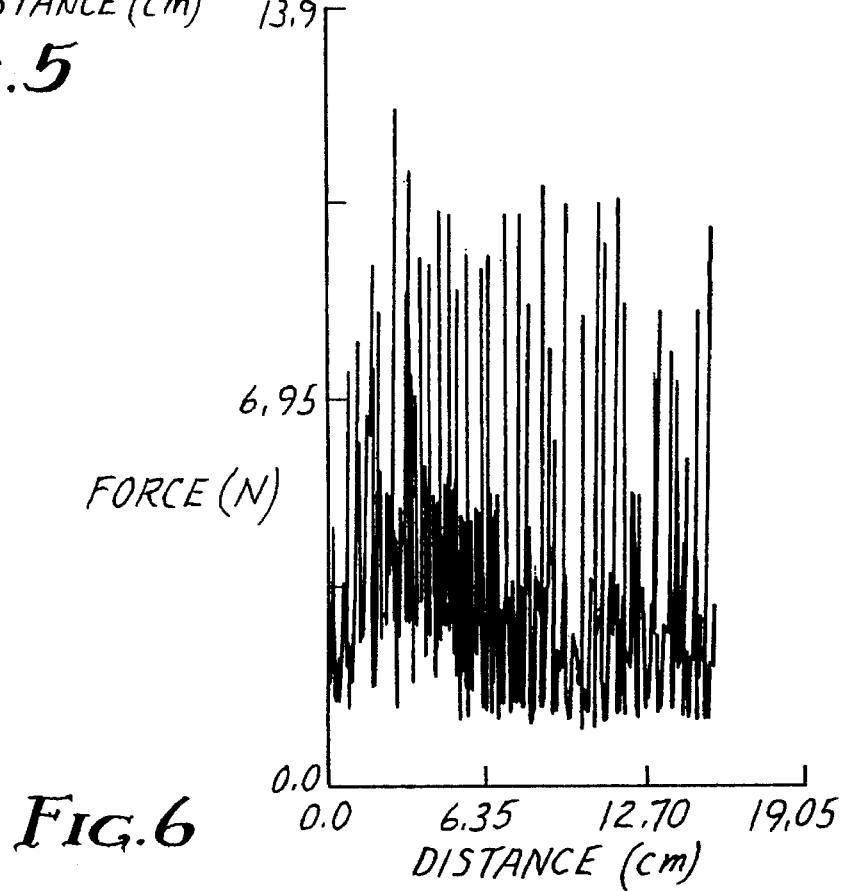
FIG. 6 shows the results, for a comparative adhesive, of a roll unwind test wherein the distance unwound is plotted as a function of the force needed.

FIGS. 5 & 6 are roll unwind curves at 0° C. and 50.8 cm/min. The following is a description of the roll unwind study:

It is known to those skillful in the art that the use of plasticizers can soften adhesives and improve roll unwind characteristics. Unexpectedly, Example 20 of this invention also has excellent unwind properties without the use of plasticizers. FIG. 5 shows a smooth roll unwind of Example 20 at 0° C. and 50.8 cm/min. FIG. 6 shows a highly raspy roll unwind of Example 17C under the same conditions. Example 20 shows that this invention has the best 'balanced' adhesive properties for insulating tapes, including adhesion to steel, adhesion to backing (before and after 65° C. 1 week storage), 65° C. shear test, oozing and roll unwind.

The following examples are offered to illustrate the invention, and are not intended to limit the scope of the invention in any way.

Test Methods

Adhesion

An insulating tape must have a minimum average adhesion strength of 0.175 N/mm to steel or to the tape backing under UL™ 510. The adhesion is determined according to the American Society for Testing and Materials (ASTM) Standard Methods of Testing Pressure-Sensitive Adhesive-Coated Tapes Used for Electrical Insulation, ASTM D1000-79, Procedure A. The peel rate used in this test was 30.5 cm/minute.

Flagging

Flagging is lifting of an end of a tape that has been applied to a curved surface. The lifted end forms a "flag" or "tab" tangent to the surface. The flagging is measured at the end of 7 days.

Storage

An unused roll of tape, in the original container, is laid flat in a full-draft circulating-air oven at 65° C., (±1° C.) for seven days. The adhesion of the tape is measured according to the procedures described above, and is listed as adhesion to steel after one week at 65° C. and adhesion to backing after one week at 65° C.

Adhesive Ooze

Adhesive ooze is measured after the 7 day storage described above. The ooze is the amount of adhesive which appears on the edges of the roll divided by the cross-sectional area of the tape in the roll.

Shear Test

A tape sample having a panel contact area of 1.27 cm×1.27 cm is adhered to an annealed stainless steel panel which is conditioned in a convection oven at 65° C. for 10 minutes. A 500 gram weight is then attached to the free end of the tape; the time is recorded until the tape falls from the steel plate.

Copper Corrosion

Three tape samples are sandwiched between two thoroughly polished copper plates, which are then clamped firmly and uniformly together using "C" clamps. The assembly is then placed in a forced ventilating oven at 100° C. for 72 hours. Upon removal from the oven, the assembly is cooled to 23° C., the plates are then unclamped and visually inspected for corrosion.

Dielectric Strength

An alternating voltage of 60 Hz is applied to a test sample through a pair of 6.35 mm diameter electrodes. The voltage is slowly increased until dielectric failure of the sample occurs.

Roll Unwind

A roll of tape is placed on a free-turning roller assembly in a tension testing machine, i.e., an Instron™ tester. The roller assembly is then clamped in the upper jaw of the machine and the free end of the tape is attached to the lower jaw of the machine. The machine is operated at specified speeds and specified temperatures.

Example

Examples 1–3C

The homopolyisoprene, Natsyn™ 2210, was pelletized into particles and dusted with talc before feeding into a twin-screw extruder (Werner & Pfleiderer Corp.). All ingredients were mixed in the extruder and then coated onto a polyvinyl chloride substrate. The coated tape was then slit into rolls with cores 2.54 cm in diameter and 1.9 cm in width. Examples 2C and 3C are comparative examples of commercially available insulating tapes, i.e., Temflex™ 1700, available from Minnesota Mining and Manufacturing Company, and Nitto 21, available from Nitto Denko KK. The composition of example 1 is listed in Table I.

Adhesion to steel and adhesion to backing of the adhesive are tested for these two commercial tapes and for Example 1 and the results are shown in Table II. The amounts are listed in phr, or parts per hundred rubber, i.e., (block copolymer+polyisoprene=100).

TABLE I

Composition of Example 1

| | phr | Comments |
| --- | --- | --- |
| Kraton™ 1107 | 50 | Polystyrene-polyisoprene block copolymer |
| Natsyn™ 2210 | 50 | Polyisoprene homopolymer |
| Wingtack™ Plus | 75 | Hydrocarbon tackifier |
| Endex™ 160 | 30 | End-block reinforcing resin |
| CAO 1 | 1 | Butylated hydroxy toluene |

TABLE II

Electrical Tape Properties

| Example | 1 | 2C | 3C |
| --- | --- | --- | --- |
| Adhesion to Steel (N/mm) | | | |
| 0° C. | 1.011 | 0.691 | 0 |
| 23° C. | 0.268 | 0.233 | 0.160 |
| 1 week @ 65° C. | 0.280 | 0.259 | 0.161 |
| Adhesion to Backing (N/mm) | | | |
| 0° C. | 0.633 | 0.614 | 0 |
| 23° C. | 0.222 | 0.214 | 0.150 |
| 1 week @ 65° C. | 0.241 | 0.206 | 0.220 |
| Flagging (cm) 7 days | 0.43 | 0.13 | 0.38 |
| Copper Corrosion | Passed | Passed | — |
| Dielectric Strength (volts/0.0254 mm) | >1,000 | 1,397 | — |

$$\text{Normalized Adhesion} = \frac{\text{Measured adhesion} \times 0.45}{\text{Measured coating weight}}$$

As can be seen, the adhesion values of the adhesive of the invention are higher than those of Examples 2C and 3C at 0° C., 23° C. and after storage. The flagging of Example 1 is also less than 0.51 cm, a commonly accepted industrial standard.

Examples 4 to 14

Examples 4–14 illustrate the use of a block copolymer, a polyisoprene homopolymer and an end block resin in the embodiment of this invention. The block copolymer used is Kraton™ 1107, the homopolyisoprene is Natsyn™ 2210, the hydrocarbon tackifier is Wingtack™ Plus and the end block resin is Endex™ 160. These compositions also comprise 1 phr CAO 1, an antioxidant. The various compositions are listed in Table III. The ingredients were hot-melt mixed and coated as discussed in Example 1.

TABLE III

| Ex | Kraton™ 1107 (phr) | Natsyn™ 2210 (phr) | Wingtack™ Plus (phr) | Endex™ 160 (phr) |
| --- | --- | --- | --- | --- |
| 4 | 60 | 40 | 70 | 30 |
| 5 | 40 | 60 | 70 | 30 |
| 6 | 60 | 40 | 80 | 10 |
| 7 | 40 | 60 | 80 | 10 |
| 8 | 50 | 50 | 75 | 20 |
| 9 | 60 | 40 | 80 | 30 |
| 10 | 40 | 60 | 70 | 10 |
| 11 | 50 | 50 | 75 | 20 |
| 12 | 60 | 40 | 70 | 10 |
| 13 | 50 | 50 | 75 | 20 |
| 14 | 40 | 60 | 80 | 30 |

The adhesion to steel and adhesion to backing of these tapes were tested according to the test methods discussed above. The results are plotted in FIGS. 1 to 4.

The compositions of the adhesives plotted in FIGS. 1–4 are shown in Table A.

Examples 15C to 20

The compositions of Comparative Examples 15C–19C and Example 20 of this invention are given in Table IV. Kraton™ 1107 (Shell Chemical Company) is a polystyrene-polyisoprene block copolymer. Natsyn™ 2210 (Goodyear Chemical Company) is a polyisoprene homopolymer. Wingtack™ Plus (Goodyear Chemical Company) and Escorez™ 1310 (Exxon Chemical Company) are solid hydrocarbon tackifiers. Wingtack™ 10 (Goodyear Chemical Company) is a liquid tackifier, Shellflex™ 371 (Shell Chemical Company) is a liquid plasticizer. Endex™ 160 is an end block resin. CAO™ 1 (PMC Specialties Group) is an antioxidant. All the tape samples were prepared by dissolving the ingredients in a 5:1 blend of heptane and methyl ethyl ketone (MEK) at approximately 30% solids by weight. The adhesive solutions were then coated using a knife coater onto a 0.15 mm thick polyvinyl chloride film and dried at a speed of 300 cm/minute in a 900-cm long oven with a 3-temperature zones at 71° C., 82° C. and 93° C. The tapes coated at this manner were then slit into rolls.

TABLE IV

| Example | 15C | 16C | 17C | 18C | 19C | 20 |
| --- | --- | --- | --- | --- | --- | --- |
| Kraton™ 1107 | 100 | 100 | 100 | 100 | 100 | 50 |
| Natsyn™ 2210 | — | — | — | — | — | 50 |
| Wingtack™ Plus | 80 | 100 | 100 | — | 100 | — |
| Escorez™ 1310 | — | — | — | 125 | — | 80 |
| Wingtack™ 10 | — | — | — | 50 | — | — |
| Shellflex™ 371 | 30 | 30 | — | — | — | — |
| Endex™ 160 | — | — | 30 | 15 | — | 30 |
| "CAO 1" | 1 | 1 | 1 | 1 | 1 | 1 |

A study of properties revealed in Table V shows that adhesives of this invention have balanced tape properties.

These tapes have adhesion to steel and adhesion to backing exceeding UL™ 510 requirements both before and after a 65° C. and 1 week storage. No measurable adhesive oozing occurred after an accelerated heat aging. It has a high retention rate of shear power at 65° C.

FIGS. 5–6 show that adhesives of this invention have a smooth unwind at high speed and low temperature without the use of a liquid plasticizer. While comparative adhesives may show one property which equals or even exceeds that of the invention, e.g., initial adhesion, other properties such as shear retention and adhesive ooze are inadequate. Only the composition of the invention show balanced adhesive properties.

TABLE V

| Example | 15C | 16C | 17C | 18C | 19C | 20 |
|---|---|---|---|---|---|---|
| Adhesion to Steel (N/mm) | | | | | | |
| 23° C. | 0.128 | 0.184 | 0.365 | 0.339 | 0.366 | 0.271 |
| 1 week @ 65° C. | 0.119 | 0.206 | 0.329 | 0.373 | 0.348 | 0.244 |
| Adhesion to Backing (N/mm) | | | | | | |
| 23° C. | 0.090 | 0.125 | 0.231 | 0.211 | 0.189 | 0.246 |
| 1 week @ 65° C. | 0.063 | 0.100 | 0.182 | 0.199 | 0.148 | 0.188 |
| 65° C. Shear Test | | | | | | |
| Before aging (mins) | 0.9 | 0.6 | 2.8 | 0.8 | 2.3 | 2.1 |
| After aging (mins) | 0.8 | 0.4 | 1.4 | 0.4 | 1.3 | 1.8 |
| Retention (%) | 89 | 67 | 64 | 50 | 57 | 86 |
| Adhesive oozing (mg/sq. mm) | 0.137 | 0.237 | 000 | 0.270 | 0.106 | 000 |
| Roll unwind | | | | | | |
| 30.5 cm/min @ 10° C. | smooth | smooth | smooth | raspy | smooth | smooth |
| 30.5 cm/min @ 0° C. | smooth | smooth | raspy | raspy | raspy | smooth |
| 50.8 cm/min @ 0° C. | smooth | smooth | highly raspy | highly raspy | highly raspy | smooth |

What is claimed is:

1. An adhesive compositions suitable for use in an insulating tape consisting essentially of:
    a) from about 13% to about 42% by weight of a polyisoprene homopolymer,
    b) from about 13% to about 42% by weight of a styrene-isoprene-styrene block copolymer,
    c) from about 25% to about 55% by weight of a solid aliphatic tackifying agent containing from about 4 to about 6 carbon atoms, and
    d) from about 2% to about 20% by weight of a reinforcing resin consisting of an aromatic, essentially hydrocarbon resin selected from the group consisting of low molecular weight polymers containing styrene, alpha-methyl styrene, para-methylstyrene, copolymers of styrene and alpha-methylstyrene, copolymers of styrene and para-methylstyrene, and copolymers of alpha-methyl styrene and para-methyl styrene
wherein said adhesive exhibits improved plasticizer resistance.

2. An adhesive composition suitable for use in an insulating tape according to claim 1 consisting essentially of:
    a) from about 20 % to about 35% by weight of a polyisoprene homopolymer,
    b) from about 20% to about 35% by weight of a styrene-isoprene-styrene copolymer,
    c) from about 30% to about 45% by weight of an aliphatic tackifying agent containing from about 4 to about 6 carbon atoms,
    d) from about 2% to about 20% by weight of an end block reinforcing resin, and
    e) from about 0.13 to about 2% by weight of an antioxidant,
wherein said adhesive exhibits improved plasticizer resistance.

3. An adhesive composition suitable for use in an insulating tape according to claim 2 wherein said antioxidant is selected from the group consisting of 2,5 di(tert-amyl)hydroquinone, and tertiary butyl hydroxytoluene.

4. An adhesive composition suitable for use in an insulating tape according to claim 1 wherein said tackifier is selected from the group consisting of rosin esters, hydrogenated rosin esters, polyterpene resins, polymerized hydrocarbon resins containing from about 4 to about 6 carbon atoms, resins from polymerized C9 hydrocarbon streams, and hydrogenated compounds thereof.

5. An adhesive composition suitable for use in an insulating tape according to claim 4 wherein said tackifier is present in an amount of from 30% to about 45% by weight.

6. An insulating tape comprising a backing containing on at least one major surface thereof an adhesive according to claim 1.

7. An insulating tape comprising a backing containing on at least one major surface thereof an adhesive according to claim 2.

8. An insulating tape according to claim 6 wherein said backing contains poly(vinyl chloride).

* * * * *